United States Patent Office 3,262,037
Patented July 19, 1966

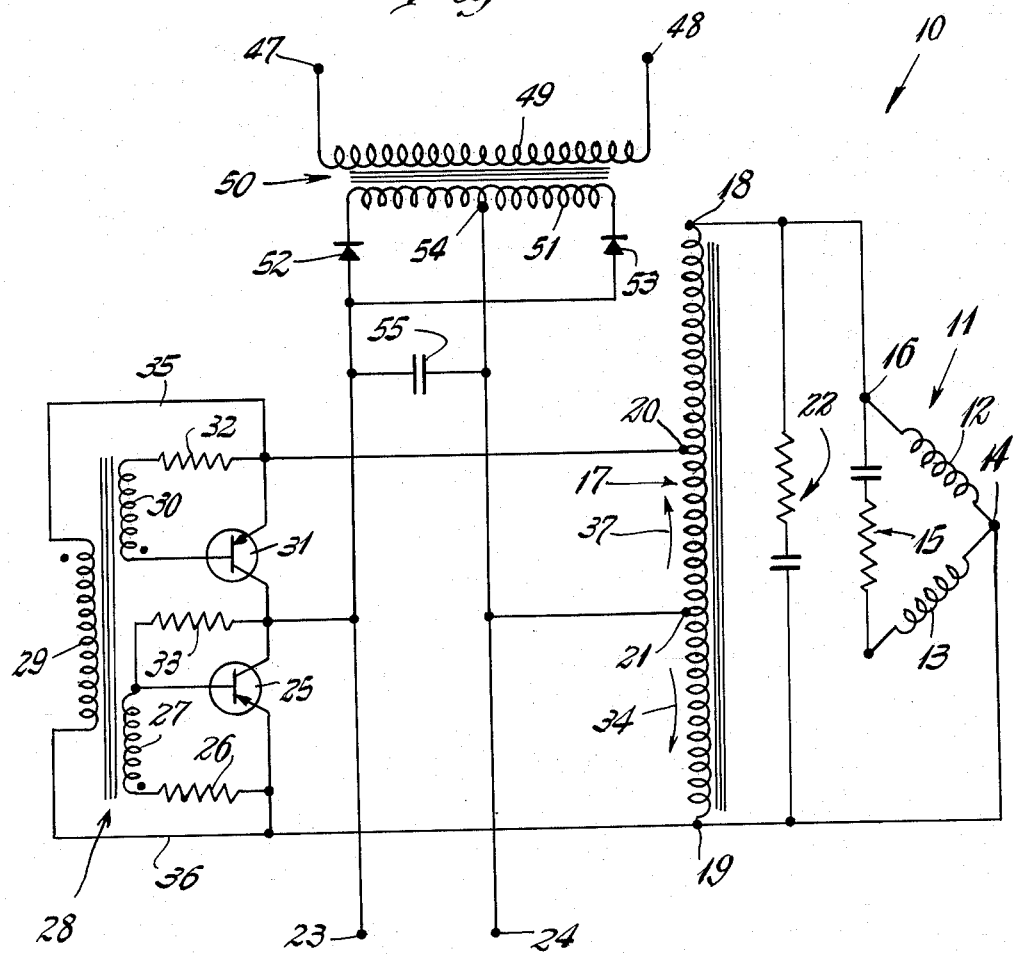
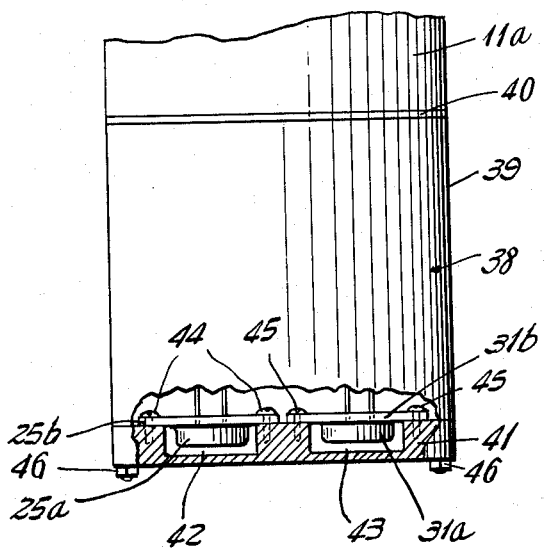

3,262,037
ALTERNATIVE A.C. OR D.C. SUPPLY FOR AN A.C. MOTOR
Owen J. McCabe, Bristol, and Allen R. Perrins, Cheshire, Conn., assignors to The Superior Electric Company, Bristol, Conn., a corporation of Connecticut
Filed May 23, 1963, Ser. No. 282,658
5 Claims. (Cl. 318—231)

The present invention relates to an electrical device for producing an alternating current output having a specific frequency and voltage from an electrical power input that has a different voltage and which may be either alternating current of a different frequency or unidirectional current.

In many applications it is necessary to supply an electrical system or unit, for example an electric motor, with alternating current power having a specific frequency and voltage in order for the system or motor to perform at its rated or desired characteristics. However, when the required power is not available and yet it is desired to operate such an electrical motor or system to obtain the desired characteristics, the electrical power available must be converted into the specific power required by the motor or system.

It is accordingly an object of the present invention to provide an electrical transducer for converting electric power, which is of a frequency different than that needed by an electrical system or motor, into electric power that has the required values which are necessary for the electrical system to operate at its rated characteristics.

Another object of the present invention is to provide an electrical transducer of the above type which may convert either unidirectional or alternating current of a different frequency into alternating current having the required frequency and voltage.

A further object of the present invention is to provide an electrical transducer for converting electric power that achieves the above-noted objects and which is relatively compact for its power handling ability, durable in use and relatively inexpensive to manufacture.

In carrying out the present invention the electrical transducer herein described has particular utility when employed to provide 60 cycle, 120 volt alternating current power to an electric motor of the type disclosed in U.S. Patent No. 2,982,872 wherein the motor when operated by power having these values is capable of rotating at a predetermined speed and with a determined torque. The electrical transducer may be connected to either a source of direct current having a voltage on the order of 28 volts and supply the above-noted required output voltage or it may be connected to an input source supplying 400 cycle, 28 volt power and also supply the above-noted voltage for the motor. In addition by reason of the arrangement of the parts and the manner in which the heat producing parts are mounted, the transducer can be effectively mounted in a compact container that, if desired, may be conveniently positioned on the motor to be unitary therewith.

Other features and advantages will hereinafter appear.

In the drawing:

FIGURE 1 is a schematic diagram of the present invention.

FIG. 2 is an elevation of the transducer with a portion of the container broken away to show interior details.

Referring to the drawing, the electrical transducer of the present invention is generally indicated by the reference numeral 10 and is shown in conjunction with a motor indicated generally by the reference numeral 11. The motor is described in the above-noted patent and includes a pair of windings 12 and 13 having a common junction 14 at one end of the windings and a phase shifting network 15 interconnecting the other ends of the windings, with an end 16 of the winding 12 serving as one input to the motor and the junction 14 being the other.

For applying 60 cycle, 120 volt power to the motor the inputs 14 and 16 of the motor are connected to an autotransformer 17 by the end 16 being connected to an end tap 18 and the junction 14 to another end tap 19. The autotransformer is further tapped as at 20 and 21 so that the portion of the winding of the autotransformer between the taps 19 and 21 is substantially equal to the portion of the winding of the autotransformer between the taps 21 and 20. Additionally to provide for suppression of voltage spikes which may be generated there is provided a spike suppressing network 22 connected across the end taps 18 and 19.

In carrying out the present invention, the electrical transducer 10 has a pair of input terminals 23 and 24 to which a D.C. supply of 28 volts may be connected with the terminal 23 being negative and the terminal 24 being positive. As shown, the terminal 24 is connected to the tap 21 while the end tap 19 is connected to an emitter of a PNP transistor 25 with the collector of transistor 25 being connected to the negative terminal 23. For controlling the conduction in the emitter-collector circuit of transistor 25 there is provided in the base-emitter circuit thereof a biasing resistor 26 and a secondary winding 27 of a transformer, generally indicated by the reference numeral 28. The transformer 28 has a primary winding 29 preferably having a relatively high D.C. resistance and another secondary winding 30. Similarly the electrical transducer includes another PNP transistor 31 having its emitter connected to the tap 20 and its collector to the negative terminal 23. In the base-emitter circuit of transistor 31 for controlling conduction in its emitter-collector circuit there is connected a biasing resistor 32 and the secondary winding 30. A starting resistor 33 is connected between the terminal 23 and the base of the transistor 25.

In the operation of the circuit heretofore described it will be appreciated that upon the application of direct current power to the negative terminal 23 and the positive terminal 24, the starter resistor 33 places between the base and emitter of the transistor 25 a negative bias which is sufficient to initiate current conduction through the emitter-collector circuit of transistor 25. This current also flows through the winding portion of the autotransformer 17 between the taps 19 and 21 in the direction indicated by the arrow 34 and causes a voltage to appear not only across the end taps 18 and 19 but also across the end tap 19 and the tap 20. This latter voltage, by reason of the leads 35 and 36, is placed on the primary winding 29 of the transformer 28. The transformer 28 is of the type that is easily saturated by reason of its core material, cross-sectional area, etc. but until the transformer 28 reaches saturation, the polarity of the voltages in the primary and secondary windings is such as to make the base of transistor 25 negative with respect to its emitter and hence maintain conduction of the transistor 25. The base of transistor 31 however is made positive with respect to the emitter and hence prevents conduction in its emitter-collector circuit. After reaching saturation, the voltage generated in the secondary windings of transformer 28 begins to decrease to a value where it ceases to provide sufficient negative bias on the transistor 25 to maintain conduction in its emitter-collector circuit. This causes the current, as indicated by the arrow 34, to cease which then produces across the taps 19 and 20 a counter voltage or "inductive kick" which has a polarity opposite to that caused by the current 34. The counter voltage in turn is placed across the primary winding 29 which induces in the secondary winding 27 a voltage that causes the transistor 25 to become reversely biased in its base-emitter circuit and which induces in the secondary winding 30 a voltage that causes the transistor 31 to become negatively biased in its base-emitter circuit. The negative bias causes the emitter-collector circuit to become conductive which in turn enales a large pulse of current to flow through the emitter-collector circuit and in the winding portion of the autotransformer 17 between the taps 21 and 20 in the direction indicated by the arrow 37. Again, as previously explained, the transformer 28 becomes saturated, ceasing conduction of the current 37 and causing a counter voltage which has an opposite polarity to that caused by the current 37 to appear across the primary winding 29 of the transformer 28. The transistor 31 will then become reversely biased in its base-emitter circuit while the transistor 25 will become conductive in its emitter-collector circuit to cause repetition of the above to produce alternate conduction through the emitter-collector of transistors 25 and 31 to produce the currents 34 and 37.

The output wave that appears across the inputs 14 and 16 of the motor 11 is substantially an alternating square wave, and voltage spikes which may be caused by the sudden initiation and cessation of current flow in the autotransformer 17 are minimized by the spike suppressing network 22.

It will be appreciated that with the above structure that the frequency of the output voltage fed to the motor is determined substantially solely by the stauration characteristics of the transformer 28. These characteristics are a result of the mechanical structure of the transformer such as core material, cross-sectional area and shape of the core and the number of turns on the windings and as such are mostly mechanical and largely impervious to temperature conditions. Accordingly the desired frequency may be maintained over a wide range of ambient temperature conditions. Moreover, it will be appreciated that these characteristics of the transformer 28 are relatively immune to changes in use and with time and thus the transducer of the present invention is capable of functioning to produce the desired frequency over an extended period.

The components of the transducer described in connection with the schematic diagram of FIG. 1 may be compactly and effectively mounted in a closed cylindrical container 38 having a tubular portion 39, a top disk 40 and a bottom base 41. The bottom base 41 is formed from relatively thick, electrical and heat conducting metal, such as aluminum, to have a pair of cylindrical recesses 42 and 43 on its inner surface. The transistors 25 and 31 are of the type, such as CTP1112, which have a protruding portion 25a and 31a and a mounting base 25b and 31b with the collector being common with the mounting base. In accordance with the present invention, the transistor 25 is mounted on the bottom base 41 as by screws 44 extending through its mounting base 25b with its protruding portion 25a being within the recess 42. Similarly the transistor 31 is mounted on the bottom base 41, as by screws 45 extending through its mounting base 31b to have its protruding portion 31a positioned within the recess. It will be appreciated that with the present structure, the bottom base 41 is a heat sink for dissipating the heat produced by the transistors and this is achieved without detriment to the transistors by making the recesses substantially larger than the protruding portions but not as large as the mounting bases. Moreover, by the use of transistors having their collectors common to their mounting bases with the bases in electrical engagement therewith, the grounding of the circuit of the transducer is effectively and efficiently achieved by having the collectors electrically connected together to the negative input terminal and to the metal heat sink base.

As further shown in FIG. 2, the transducer of the present invention may be secured to the motor casing 11a to form a unitary structure with the motor casing by screws 46 that pass through the top disk 40, bottom base 41 and thread into the motor casing 11a.

While the electrical transducer 10 of the present invention has been described as being operated by a unidirectional current applied to the terminals 23 and 24 and having a voltage value less than the desired motor voltage, the circuit is also capable of functioning when a different frequency of alternating current constitutes the source of electrical power source. Thus the present electrical transducer includes another pair of input terminals 47 and 48 which may be connected to a source of alternating current having 400 cycles, for example, with the unidirectional equivalent voltage of 28 volts and yet provide the proper power for the motor 11. The terminals 47 and 48 are connected to a primary 49 of a transformer 50 having a center tap secondary winding 51. Connected to the ends of the winding 51 are diodes 52 and 53 which are joined and subsequently connected to the negative input terminal 23. The center tap 54 is connected directly to the positive terminal 24. In addition a smoothing capacitor 55 is preferably provided to smooth the rectified alternating current.

Thus the circuit of the present invention may function by the application of an alternating current to the terminals 47 and 48 or a unidirectional current to the terminals 23 and 24, the unidirectional values of the voltage of these currents being the same. It will be understood that the autotransformer 17 by reason of the motor inputs 14 and 16 being connected across its end taps 18 and 19 and the taps 19, 20 and 21 only being connected to a part of the winding that the autotransformer functions to increase the input voltage to the transducer to the value needed by the motor.

It will accordingly be appreciated that there has been disclosed an electrical transducer that receives electrical power from one source and changes it into a different form of electrical power. The different form consists of an alternating current having a specific frequency and voltage while the input power may be in one instance a unidirectional current or in another instance an alternating current having a different frequency and voltage. The output power of the transducer of the present invention has particular utility when utilized to provide the electric power for an electric motor so that the motor may function at its rated characteristics. In addition, by the use of the components hereinbefore set forth, their electrical interconnection and the manner by which some of the components are structurally mounted on a casing enclosing the components, a compact, durable electrical transducer is provided which may be secured to the motor casing to become a unitary part thereof.

Variations and modifications may be made within the scope of the claims and portions of the improvements may be used without others.

We claim:

1. For use with an electric motor of the type having a two-phase field winding operable by alternating current, an electrical transducer for producing the alternating current of a specific frequency and voltage from a unidirectional power source having a different voltage to operate the motor, said transducer comprising a pair of input terminals connectible to the source of unidirectional power, an autotransformer having a pair of output terminals across which the alternating current appears and first, second and third taps defining two substantially equal winding portions, a pair of transistors having their collectors connected to one input terminal, means connecting the other input terminal to the second tap, means connecting the emitter of one transistor to the first tap and the emitter of the other transistor to the third tap, a transformer having a primary winding and two secondary windings, means connecting the primary winding to the first and third taps, means connecting one secondary winding between the base and emitter of one transistor and the other secondary winding between the base and emitter of the other transistor, whereby said transistors are caused to alternately conduct in their emitter-collector path to produce said alternating current for said motor, said transistors each being of the type having a protruding portion and its collector common with a mounting base, and means for containing said electrical transducer and including a relatively thick heat sink portion formed from electrical and heat conducting metal, said heat sink portion being formed with a pair of recesses with the protruding portion of each transistor being positioned within a recess and its mounting base being secured to the heat sink portion.

2. The invention as defined in claim 1 in which the one input terminal to which the collectors are connected constitutes the negative input terminal.

3. The invention as defined in claim 1 in which each recess is substantially larger than the protruding portion but smaller than the mounting base.

4. The invention as defined in claim 1 in which there is provided rectifying means connected to the input terminals and input means connected to a source of alternating current having a different frequency and voltage than the specific frequency and voltage.

5. The invention as defined in claim 1 in which the electric motor has a casing and means mounting the transducer on the motor casing.

No references cited.

ORIS L. RADER, *Primary Examiner.*

G. FRIEDBERG, *Assistant Examiner.*